No. 672,111. Patented Apr. 16, 1901.
I. L. VANSCHOIACK.
CULTIVATOR ATTACHMENT.
(Application filed June 21, 1900.)
(No Model.)
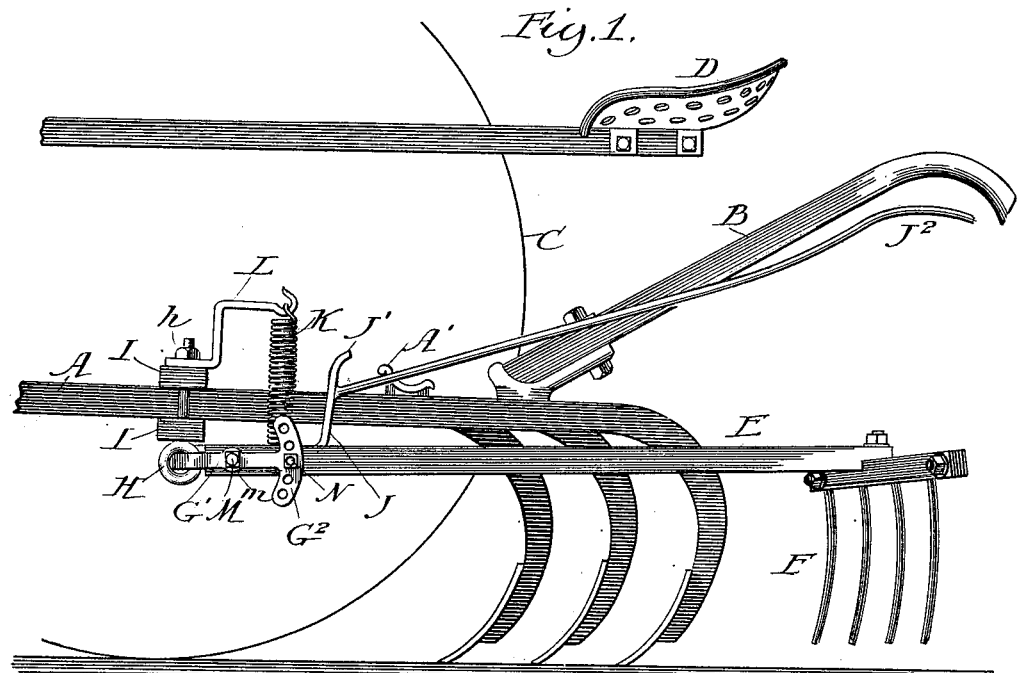
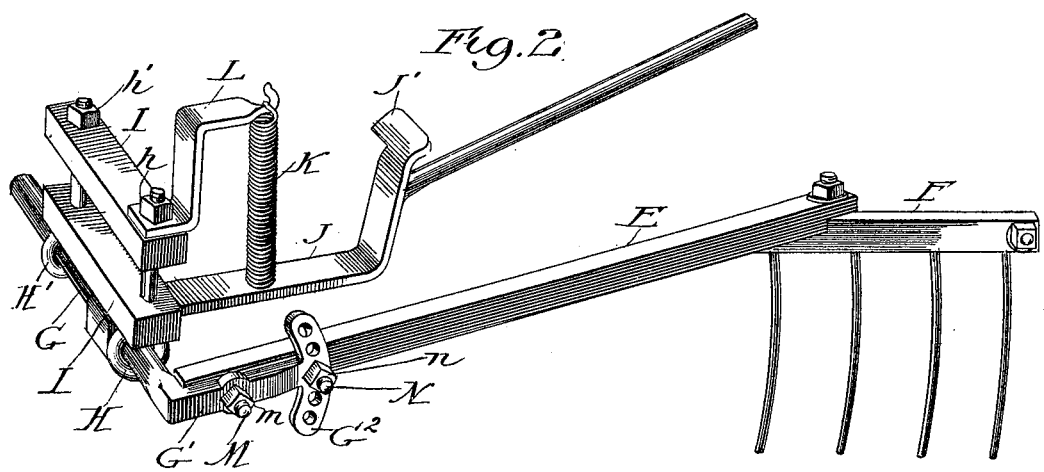

UNITED STATES PATENT OFFICE.

ISAAC L. VANSCHOIACK, OF SUGARGROVE, ILLINOIS.

CULTIVATOR ATTACHMENT.

SPECIFICATION forming part of Letters Patent No. 672,111, dated April 16, 1901.

Application filed June 21, 1900. Serial No. 21,049. (No model.)

*To all whom it may concern:*

Be it known that I, ISAAC L. VANSCHOIACK, a citizen of the United States, residing at Sugargrove, in the county of Kane and State of Illinois, have invented certain new and useful Improvements in Uncovering Attachments for Cultivators, of which the following is a specification.

In cultivating small plants it frequently happens that the cultivator-teeth will throw earth or clods onto the plants and either wholly or partially cover them to such an extent that unless again uncovered they are either injured or destroyed.

The object of the present invention is to provide means attached or adapted to be attached to the cultivator whereby the plants may be easily and quickly uncovered without stopping the cultivator. To this end I provide an attachment having a depressible arm carrying at its outer end a rake or equivalent device and having its inner end pivotally mounted so that it may swing up and down, means being provided for yieldingly holding it normally in elevated position and means being provided for depressing it in order to throw the rake into contact with the ground when it becomes necessary to uncover a plant. This means for depressing the arm will vary with the character of the cultivator with which the attachment is used. For example, in a combined riding and walking cultivator it will have a treadle within reach of the driver's foot to be used while he is riding, and in addition it will have a part arranged near the handle of the cultivator within easy reach of the driver's hand to be used while he is walking. When the cultivator is not a combination riding and walking cultivator, the appropriate one of these two operating devices will be used.

The invention consists in the features of novelty that are herein described, and in order that it may be fully understood I will describe it with reference to the accompanying drawings, which are made a part hereof, and in which—

Figure 1 is a side elevation of a portion of a combined riding and walking cultivator with the improved uncovering attachment. Fig. 2 is a perspective view of the improved uncovering attachment on a somewhat larger scale. Fig. 3 is a detail view.

A represents one of the beams, B one of the handles, C one of the wheels, (the near wheel being removed,) and D the seat, of a combined riding and walking cultivator.

E is an arm carrying at one end a rake or equivalent device F and having its other end pivotally mounted, so that the end carrying the rake may be pressed in order to bring the rake in contact with the ground. Where the device is made as a separate attachment adapted to be applied to the cultivator, its pivotal mounting preferably consists of a rock-shaft G, disposed at right angles to the arm and rotatively mounted in bearings carried by a clamp which is adapted to clamp the beam of the cultivator. This clamp preferably consists of a pair of eyebolts H H', a pair of plates or blocks I, perforated for the passage of the stems of the bolts, and a pair of nuts $h$ $h'$, turned onto the bolts and adapted to force the plates I together, clamping the beam between them, as shown. The bearing for the shaft consists of the eyes of the bolts H H', through which the shaft passes.

As cultivators differ with respect to the location of the beams, it is necessary in order to enable the use of the device as an attachment adapted to be applied to any cultivator, regardless of the location of the beam, to provide for the lateral adjustment of the arm E with respect to the clamp. To this end I prefer to make the shaft of considerable length, so that it may be adjusted endwise in its bearing. Any suitable means may be used for holding it in place as against endwise displacement after it is once adjusted to proper position.

J is a lever adjustably secured to the shaft and projecting laterally therefrom. K is a spring, one end of which is attached to said lever and the other end of which is attached to a bracket-arm L, which in turn is supported by the clamp. To this end the foot of the bracket-arm is perforated for the passage of the eyebolt H, so that this bolt and its nut serve not only to force the plates I together, but also to hold this bracket-arm in place. This means for attaching the bracket-arm enables it to be swung to different radial positions with respect to the bolt H. In order to adjustably secure the lever J to the rock-shaft, the end of said lever is provided with an open eye, the opposite sides of which are perforated for the passage of the bolt j, threaded to receive a nut j'. This permits the lever J to be adjusted longitudinally upon the rock-shaft and also enables the lever to be rigidly secured to said shaft when the adjustment is once accomplished. The eye of this lever, as shown in the drawings, is disposed in proximity to the eye of the bolt H, and this constitutes the means for preventing the endwise movement of the rock-shaft in one direction—i. e., outward. There will be very little tendency to movement in the opposite direction; but any such tendency is resisted by the tension of the spring K. The lever J is provided in the vicinity of the stirrup A', in which the foot of the operator rests, with a treadle J', which is adapted to be engaged by the toe of the operator for depressing the lever in opposition to the resistance of the spring K. This depression of the lever J will, acting through the rock-shaft, depress the arm E, bringing the rake F into contact with the ground, and when the pressure is removed from the treadle the spring K will again restore the arm E to its elevated position. For enabling the arm E to be depressed while the operator is walking the lever J is extended, as shown at J², to a position within easy reach of the hand of the operator in his position at the handles of the cultivator.

It is desirable that when in normal position the teeth of the rake F shall be only two or three inches above the ground, and as cultivators differ with respect to the height of the beam it becomes necessary to adjust the inclination of the arm E. To this end the rock-shaft is provided with a portion G', disposed at right angles to it and provided with a perforation, said portion G' terminating in a T-head G², provided with a series of perforations that are concentric with the perforation of the part G'. Through the perforation of the part G' passes a bolt M, which also passes through a perforation of the arm E and receives a nut m, and through one or another of the perforations of the T-head passes a bolt N, which also passes through a perforation of the arm E and receives a nut n. Thus the arm E is pivotally mounted upon the bolt M, and by removing the bolt N the arm may be adjusted to the desired position, after which it may be fixed by replacing the bolt N in the appropriate perforation of the T-head.

I have herein termed my invention an "attachment for cultivators;" but I desire to have it understood that the invention is not limited to an attachment in any limited sense of this term or, in other words, to a device which is adapted to be attached to and removed from the cultivator at will.

Having described my invention, what I claim as new therein, and desire to secure by Letters Patent, is—

1. The combination with a cultivator having a beam provided with a stirrup for the foot of the driver, of an uncovering attachment therefor having a depressible arm, means for attaching it to the beam, means including a spring for holding it yieldingly in elevated position so that it will respond to outward pressure, and a lever for depressing it, said lever having a foot-treadle in the vicinity of the stirrup, substantially as set forth.

2. The combination with a cultivator of an uncovering attachment therefor having a depressible arm, means for attaching it to a part of the cultivator, means including a spring for holding it yieldingly in elevated position so that it will respond to downward pressure, and means for adjusting the inclination of the arm, substantially as set forth.

3. An uncovering attachment for cultivators having, in combination, a depressible arm, a clamp by which said arm is supported, said clamp being adapted to clamp a portion of the cultivator, and means carried by the clamp for holding the arm normally in elevated position, substantially as set forth.

4. An uncovering attachment for cultivators having, in combination, a depressible arm, a rock-shaft by which it is carried, a bearing in which the rock-shaft is mounted, and means for holding the arm normally in elevated position, substantially as set forth.

5. An uncovering attachment for cultivators having, in combination, a depressible arm, a rock-shaft by which it is carried, a clamp adapted to clamp a portion of the cultivator, said clamp having a bearing for the rock-shaft, and means including a spring supported by the clamp for holding the arm in an elevated position, substantially as set forth.

6. An uncovering attachment for cultivators having, in combination, a depressible arm, a rock-shaft by which the arm is carried, a clamp adapted to clamp a portion of the cultivator, said clamp having a bearing in which the rock-shaft is mounted, a lever projecting laterally from the rock-shaft for rocking the shaft and depressing the arm, a spring attached at one end to said lever, and a bracket-arm to which the other end of said spring is attached, said bracket-arm being supported by the clamp, substantially as set forth.

7. An uncovering attachment for cultivators having, in combination, a depressible arm, a rock-shaft by which it is carried, a clamp adapted to clamp a portion of the cultivator, said clamp having a bearing in which the rock-shaft is mounted, said rock-shaft being adjustable longitudinally in said bearing, means for holding it to its adjustment, means for holding the arm normally in elevated position, and means for depressing the arm, substantially as set forth.

ISAAC L. VANSCHOIACK.

Witnesses:
  WILL GORDON,
  SARSON L. JUDD.